June 27, 1939.   W. DÄLLENBACH   2,163,870
ENDLESS FILM BAND REELING APPARATUS
Filed April 16, 1936   2 Sheets-Sheet 1

Inventor:
WALTER DALLENBACH
By Henry J. Lucke
his Attorney

Inventor:
WALTER DALLENBACH

Patented June 27, 1939

2,163,870

UNITED STATES PATENT OFFICE 2,163,870

ENDLESS FILM BAND REELING APPARATUS

Walter Dällenbach, Berlin-Charlottenburg, Germany, assignor to Julius Pintsch Kommanditgesellschaft, Berlin, Germany Application April 16, 1936, Serial No. 74,796
In Germany April 18, 1935

5 Claims. (Cl. 88—18.7)

The present invention relates to means for conveying and feeding an endless band or strip of film and more especially an endless film band or strip bearing on one side sound records in a plurality of parallel tracks.

The conveying and feeding means according to the present invention are particularly applicable to film phonographs, that is to say apparatuses which reproduce sound records from film strips carrying photographically-applied sound recordings, in contradistinction to the usual phonographs which play disc records.

It is an object of the invention to provide a film guiding and conveying apparatus that is efficient and reliable in operation and which does not harm or damage the film and does not expose it to but slight wear.

It is a further object of the invention to provide for the ready replacement of a film in the apparatus, and to avoid the difficulties which arise when this operation occurs in the usual devices of this sort.

According to this invention there is provided a film conveying apparatus adapted for paying out and re-reeling an endless film, including a rotary film spool carrier having a core, and a film driving drum, the axis of said film spool carrier being inclined with respect to that of said driving drum and said film spool carrier being freely rotatable.

By the expression "inclined" as used in the preceding paragraph and hereafter in connection with the relative disposition of the axis of the film spool carrier and the film driving drum, I mean that these axes are non-parallel and are not arranged at righ-angles to each other.

Preferably the film conveying arrangement according to the invention is such that the band or strip of film runs off a film-spool carrier and is rewound thereon, and is conducted over a roller or drum to the illuminating point. To ensure a smooth and uniform unwinding of the film, the axis of the rotary film-spool carrier is arranged on the skew with respect to the axis of the winding drum in a suitable manner, and the core of this carrier is so shaped that the outer surface merges smoothly into the base plate of the film-spool carrier or that the lower part of this core is substantially cylindrical. Moreover the central or upper part of the core is shaped in such a way that the core forms a concave contact surface for the film as it is unreeled, whereby it always happens that only the edge of the film lies upon this surface. Advantageously a cylindrical mount of greater diameter than the core is provided between the core and the base plate and furnishes an improved positioning of the film spool upon the base plate.

The core, which in its preferred form will have the shape of a turret, is advantageously made integral with the base plate, and for example these parts may be die-pressed from board.

Preferably the core is of circular cross-section.

A dish-like cove-plate can be provided at the side of the core remote from the base-plate. Preferably the cover-plate is arranged at such a height above the base-plate and is of such profile that when the film is being unwound from its spool, one edge thereof rides over the underside of the cover-plate, whereby the latter assists in the guiding of the strip.

A guiding roller may be used to guide the film to the spool carrier.

A particularly advantageous result is obtained by arranging that the film strip be guided in the spool carrier unit and on its journey to and from the reproduction point in such a way that the curvature of the film strip has the same sign (in the mathematical sense) over its whole length, and there is no point of inflexion.

The film spool carrier, consisting of base-plate with film and core and optional cover-plate constitutes, in a preferred embodiment, a unitary whole which is easily interchangeable by another.

The carrier may be provided with a readily removable protective casing so that when the carrier and film have been inserted and the latter is ready for projection, the casing can be taken off, so that the latter forms a practical container or box for the film.

Embodiments of the invention are shown by way of example in the accompanying drawings, in which.

Figure 1:
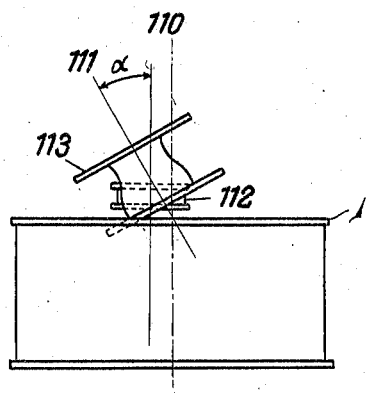
Figure 1 illustrates in diagrammatic end view an arrangement of the film spool carrier in the film conveying device.
Figure 2:
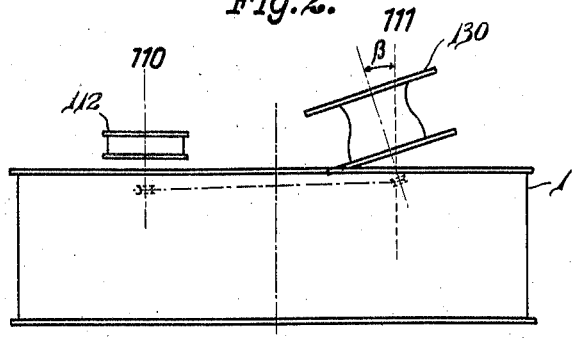
Figure 2 is a side view corresponding to Figure 1.

In Figures 1 and 2, 110 designates the axle of the film driving roller 112 and 111 the axle of the film spool 113 both these axles being mounted on a cabinet 1. The axle 111 is so inclined with respect to the axle 110 that it cannot be made to coincide with the latter when the phonograph is viewed from that angle at which the two drums appear to be in line. At the same time the axle 111 is inclined in a second direction in the system of co-ordinates with respect to the axle 110, as is apparent from Fig. 2. The inclination is preferably such that the upper portion of the axle 111 carrying the film spool carrier 113 is nearer to the upper end of the axle 110 than is the lower portion of the axle 111, the latter being fixed to the base plate of the film phonograph. The angle β shown in Fig. 2 is smaller than the angle α (Fig. 1). In every case the extent of the inclination in both directions, depends upon the material which is used for the film and upon the diameter of the film spool. In many cases it will be necessary to make the angle β equal to the zero, i. e. merely to incline the axle 111 in the manner shown in Fig. 1. If the phonograph is to be employed for a plurality of films of different kinds, it may be of advantage to attach the axle 111 to the base plate, so that it can be inclined just as is wanted.

Figure 3:
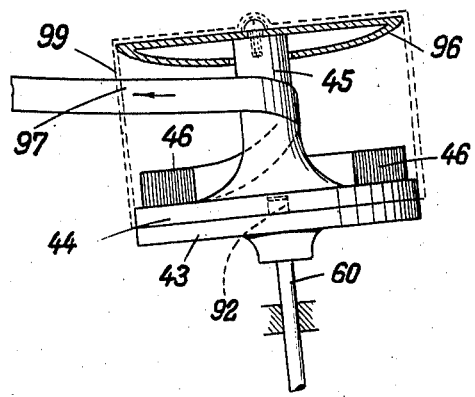
Figure 3 shows, partly in section, a preferred form of film spool carrier, core and base-plate, showing the cover-plate also.

The core of the film spool carrier is illustrated in Fig. 3. Here 43 is a plate resembling the usual phonograph turntable, and this plate is capable of rotation about the shaft 60. The base plate 44 of the film spool carrier is inserted over a central boss 92 on the plate or table 43, and is suitably mounted upon this plate or table 43, for example by means of a friction coupling between the base plate and the plate or table 43, the latter being preferably provided, at least on that side facing the base plate, with a covering of cloth or the like in such a way that this base plate 44 is directly above the cloth. The coiled endless film band is laid upon the base plate or carrier 44. A turret or core 45 is arranged at the centre of the base plate 44 and merges smoothly into the latter. It is assumed that the parts 44 and 45 are formed integrally with one another, and the boundary line of the parts 44 and 45 may have the approximate shape of a semi-hyperbola or may be constructed in the manner shown in greater detail in Fig. 4. Upon the turret is a cover plate 96 of which the side nearest the film has such a shape that it is able suitably to guide the rising film at about the place marked 97. The innermost winding of the film 46 is disposed around the turret 45 in the manner indicated and is withdrawn in the direction of the arrow, being rewound on the outside of the film 46 (see Fig. 5). In this latter figure the image aperture may be arranged at 8, while it can be seen therefrom that the band or strip of film is so guided that its curvature always has the same sign.

The film spool carrier is either driven solely by the withdrawal of the inner winding by means of a film conveying roller inserted behind or in front of 8, or also by an additional and special drive which may be coupled to the motor as diagrammatically illustrated in Fig. 2. The film spool carrier is surrounded by the protective casing 99 which is suitably made easily removable.

Figure 4:
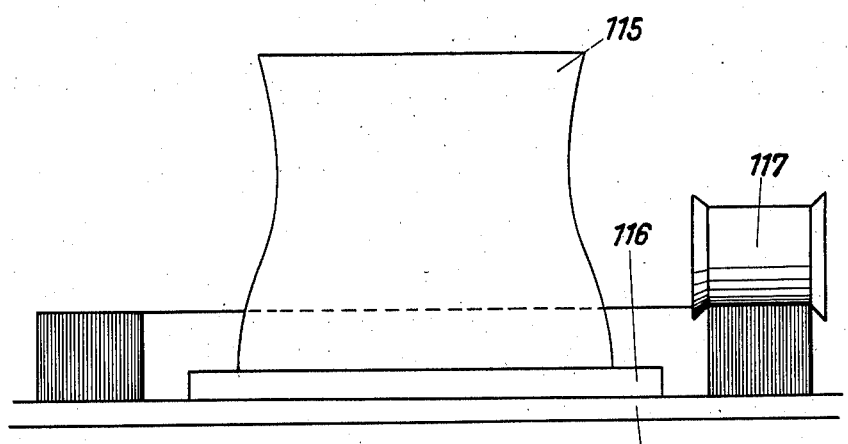
Figure 4 is an enlarged view of the core and spool.
Figure 5:
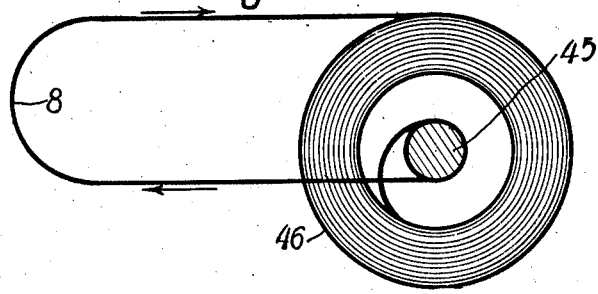
Figure 5 is a diagram showing the system of unwinding and re-reeling the film.

Fig. 4 illustrates an especially satisfactory form of film spool carrier. Here 115 designates the core and 44 the base plate of the latter. The core is so formed that it is approximately cylindrical at the part adjacent the base plate, while it will have at its upper part the shape shown in Fig. 4 over a part equal in length to or slightly less than the width of the film. A mount is arranged at 116 between the core and the base plate and provides a better bearing of the film spool upon the carrier for the latter. The particular shaping of the film carrying parts as described results in the film running over the core at its edge only, when the coil is correspondingly inclined. In such an arrangement only the side face of a guide or auxiliary roller such as that illustrated at 117 is needed to press the film down upon the base plate. The chamfered ends of the roller prevent a lateral wandering of the film while the latter is being uncoiled and wound up again without the ends of the film coming into contact with the roller during normal running. The height of the core of the spool carrier is equal to about two or three times the width of the film. Occasionally it is possible to omit the conducting or auxiliary roller 117 completely. The unwinding or rewinding of the strip or band of film may take place at the same height, i. e. the film may be forwarded in approximately one plane parallel to the base plate of the film phonograph by inclining the film spool carrier as a whole. The turntable and the film may be taken as a whole and inserted over an axle, so that when it is required to change the film, the spool itself does not have to be touched. However, there might also be employed a clamping device for the film.

If a film is to be reproduced, a container loaded with the film is placed on the plate 43, the protective casing is removed and the free loop of film somewhat expanded and arranged to pass over the reproducing point, whereupon reproduction may commence. When this is finished, the film loop is withdrawn from the reproducing point and the loop contracted to a suitable size by rotating the container, whereupon the casing can be replaced.

The invention may be employed with all kinds of endless films.

What I claim is:

1. A film conveying apparatus for paying-out and re-reeling a coiled endless film band, comprising a rotatable spool including a coil supporting plate and a core, said core being centrally mounted on said plate and projecting axially, at least by the width of the film beyond the coil portion of the film on the plate, the projecting portion of said core gradually decreasing in diameter uniformly towards its axis outwardly from the plate to guide an edge of the film out of the coil, a rotatable film driving drum around which a loop of the film extends, means for supporting said film driving drum, means to support said spool with its axis in a predetermined inclined position with respect to the axis of the drum, and means for driving said film drum to pull the film from the projecting portion of the core.

2. A film conveying apparatus for paying-out and re-reeling a coiled endless film band, comprising a rotatable spool including a coil supporting plate and a core, said core being centrally mounted on said plate and projecting axially, at least by the width of the film beyond the coil portion of the film on the plate, the projecting portion of said core gradually decreasing in diameter uniformly towards its axis outwardly from the plate to guide an edge of the film out of the coil, a rotatable film driving drum around which a loop of the film extends, means for supporting said film driving drum, means to support said spool with its axis in a predetermined inclined position with respect to the axis of the drum, means for driving said film drum to pull the film from the projecting portion of the core, and a cap mounted on said core and assisting the core to guide the film as it leaves the core.

3. A film conveying apparatus for paying-out and re-reeling a coiled endless film band, comprising a rotatable spool including a coil supporting plate and a core, said core being centrally mounted on said plate and projecting axially, at least by the width of the film beyond the coil portion of the film on the plate, the projecting portion of said core gradually decreasing in diameter uniformly towards its axis outwardly from the plate, but gradually increasing towards the plate and merging smoothly into the plate to guide an edge of the film out of the coil, a rotatable film driving drum around which a loop of the film extends, means for supporting said film driving drum, means to support said spool with its axis in a predetermined inclined position with respect to the axis of the drum, and means for driving said film drum to pull the film from the projecting portion of the core.

4. A film conveying apparatus for paying-out and re-reeling a coiled endless film band, comprising a rotatable spool including a coil supporting plate and a core, said core being centrally mounted on said plate and projecting axially, at least by the width of the film beyond the coil portion of the film on the plate, the projecting portion of said core gradually decreasing in diameter uniformly towards its axis outwardly from the plate, then gradually increasing in diameter away from its axis outwardly from the plate to guide an edge of the film out of the coil, a rotatable film driving drum around which a loop of the film extends, means for supporting said film driving drum, means to support said spool with its axis in a predetermined inclined position with respect to the axis of the drum, and means for driving said film drum to pull the film from the projecting portion of the core.

5. A film conveying apparatus for paying-out and re-reeling a coiled endless film band, comprising a rotatable spool including a coil supporting plate and a core, said core being centrally mounted on said plate and projecting axially, at least by the width of the film beyond the coil portion of the film on the plate, the projecting portion of said core gradually decreasing in diameter uniformly towards its axis outwardly from the plate to guide an edge of the film out of the coil, a rotatable film driving drum around which a loop of the film extends, means for supporting said film driving drum, means to support said spool with its axis in a predetermined inclined position with respect to the axis of the drum, and means for driving said film drum to pull the film from the projecting portion of the core, the gradually decreasing diameter of the core being in the shape of a semi-hyperbola, a base plate, and means for removably mounting said plate on said base plate.

WALTER DÄLLENBACH.